United States Patent
Cho et al.

(10) Patent No.: US 11,080,519 B2
(45) Date of Patent: Aug. 3, 2021

(54) METHOD AND APPARATUS FOR GESTURE RECOGNITION

(71) Applicant: WRT LAB CO., LTD., Seoul (KR)

(72) Inventors: Sung Ho Cho, Seoul (KR); Jun Bum Park, Seoul (KR)

(73) Assignee: WRT LAB CO., LTD., Seoul (KR)

( * ) Notice: Subject to any disclaimer, the term of this patent is extended or adjusted under 35 U.S.C. 154(b) by 172 days.

(21) Appl. No.: 16/486,191

(22) PCT Filed: Feb. 13, 2018

(86) PCT No.: PCT/KR2018/001886
§ 371 (c)(1),
(2) Date: Aug. 15, 2019

(87) PCT Pub. No.: WO2018/151503
PCT Pub. Date: Aug. 23, 2018

(65) Prior Publication Data
US 2020/0242342 A1 Jul. 30, 2020

(30) Foreign Application Priority Data
Feb. 16, 2017 (KR) .................. 10-2017-0021074

(51) Int. Cl.
*G06K 9/00* (2006.01)
*G06K 9/62* (2006.01)
(Continued)

(52) U.S. Cl.
CPC .......... *G06K 9/00335* (2013.01); *G01S 7/292* (2013.01); *G01S 13/0209* (2013.01);
(Continued)

(58) Field of Classification Search
None
See application file for complete search history.

(56) References Cited

U.S. PATENT DOCUMENTS 10,235,994 B2 * 3/2019 Huang ............... G06N 3/08
2011/0181509 A1 7/2011 Rautiainen et al.
(Continued)

FOREIGN PATENT DOCUMENTS

CN 102968642 A * 3/2013
KR 10-2016-0128318 A 11/2016
(Continued)

OTHER PUBLICATIONS

Zhichong Zhou, 'Ultra-Wideband Radar Based Human Motion Analysis' (2016), Electronic Theses and Dissertations, Jun. 2016, pp. 1-53.
(Continued)

*Primary Examiner* — Mohammed Rachedine
(74) *Attorney, Agent, or Firm* — Locke Lord LLP; Scott D. Wofsy

(57) ABSTRACT

Provided is a method including steps: (a) storing in a database an eigenvector and an eigenvalue for each recognizable gesture, with respect to a first signal input through a radar apparatus and a second signal resulting from removing background information from the first signal: (b) receiving a third signal from which to determine a gesture, as an input, from the radar apparatus: (c) removing background information from the third signal from which to determine the gesture to obtain a fourth signal: (d) computing an inner product of the eigenvector and a signal matrix relating to each of the third signal from which to determine the gesture and the fourth signal resulting from removing the background information from the third signal: and (e) comparing the computed inner product with the eigenvalue in the database, in which the eigenvector is extracted from signals of all recognizable gestures and the eigenvalue, and the eigenvalue for each recognizable gesture is an inner product
(Continued)

of the eigenvector and the signal for a corresponding one of the recognizable gestures.

12 Claims, 4 Drawing Sheets

(51) Int. Cl.
    *G06N 20/10*     (2019.01)
    *G06N 3/08*     (2006.01)
    *G06F 3/01*     (2006.01)
    *G01S 7/292*     (2006.01)
    *G01S 13/62*     (2006.01)
    *G01S 13/02*     (2006.01)
    *G01S 13/04*     (2006.01)

(52) U.S. Cl.
    CPC .............. *G01S 13/04* (2013.01); *G06F 3/017* (2013.01); *G06K 9/00503* (2013.01); *G06K 9/00523* (2013.01); *G06N 3/08* (2013.01); *G06N 20/10* (2019.01)

(56) References Cited

U.S. PATENT DOCUMENTS

| | | | | |
|---|---|---|---|---|
| 2012/0106298 | A1* | 5/2012 | Liu | G06K 9/6247 367/87 |
| 2012/0272194 | A1* | 10/2012 | Yang | G06F 3/0346 715/863 |
| 2012/0280900 | A1 | 11/2012 | Wang et al. | |
| 2014/0266860 | A1* | 9/2014 | Blumrosen | G01S 7/62 342/106 |
| 2018/0088671 | A1* | 3/2018 | Wang | G06F 3/0304 |

FOREIGN PATENT DOCUMENTS

| | | | |
|---|---|---|---|
| KR | 10-2017-0012422 A | 2/2017 | |
| WO | WO-2010046101 A1 * | 4/2010 | G06K 9/4633 |

OTHER PUBLICATIONS

International Search Report issued in PCT/KR2018/001886, dated Jul. 23, 2018.

* cited by examiner (a) SIGNAL THAT IS INPUT (b) SIGNAL THAT RESULTS FROM REMOVING
BACKGROUND INFORMATION (a)

(b)

METHOD AND APPARATUS FOR GESTURE RECOGNITION

CROSS REFERENCE TO RELATED APPLICATIONS

This application is a U.S. National Phase Application filed under 35 U.S.C. § 371, based on International PCT Patent Application No. PCT/KR2018/001886, filed Feb. 13, 2018, which application claims priority to Korean Patent Application No. KR 10-2017-0021074 filed on Feb. 16, 2017. The entire contents of these applications is incorporated herein by reference in their entirety.

TECHNICAL FIELD

The present invention relates to a gesture recognition method and a gesture recognition apparatus that performs the gesture recognition method.

BACKGROUND ART

Gesture recognition is performed using an image that is captured primarily by a camera. However, when a method that uses the camera is employed, the gesture recognition is not properly performed in a case where light is strong or where no light is present, or in a case where smoke or fog blocks the camera's view, and the risk of not ensuring a user's privacy due to the camera occurs.

In addition, in a case where a radar is used for gesture recognition, many radars are necessary to perform three-dimensional gesture recognition, thus incurring high cost.

DISCLOSURE

Technical Problem

Accordingly, the present invention has been made keeping in mind the above problems occurring in the related art, and an objective of the present invention is to provide a gesture recognition method that uses a single radar and a gesture recognition apparatus that uses the gesture recognition method.

Technical Solution

In order to achieve the objective described above, according to an aspect of the present invention, there is provided a gesture recognition method including steps of: (a) storing in a database an eigenvector and an eigenvalue for each recognizable gesture, with respect to a signal that is input through a radar apparatus and a signal that results from removing background information from the signal that is input through the radar apparatus; (b) receiving a signal from which to determine a gesture, as an input, from the radar apparatus; (c) removing the background information from the signal from which to determine the gesture; (d) computing an inner product of a signal matrix relating to each of the signal from which to determine the gesture and the signal that results from removing the background information and the eigenvector; and (e) comparing the computed inner product with the eigenvalue in the database, in which the eigenvector is extracted from signals of all recognizable gestures, and each of the eigenvalues for the respective recognizable gestures is an inner product of the eigenvector and the signal for a corresponding one of the recognizable gestures.

In the gesture recognition method, the eigenvector that is to be stored in the database may be extracted by obtaining a covariance matrix for a signal matrix relating to the signals of all the recognizable gestures and then by obtaining an eigenvalue of the covariance matrix and eigenvectors.

In the gesture recognition method, as the eigenvectors that are to be stored in the database, only an arbitrary number of the eigenvectors obtained from the covariance matrix may be extracted in order of decreasing an eigenvalue.

In the gesture recognition method, the eigenvalues that are stored in the database may be input into a neural network and the neural network may learn a method of determining the gesture using machine learning, and in step (e), the computed inner product may be input into the neural network, and thus the gesture may be determined.

According to another aspect of the present invention, there is provided a gesture recognition method including steps of: (a) storing an eigenvector and an eigenvalue for each recognizable gesture; (b) receiving a signal from which to determine a gesture, as an input, from a radar apparatus; (c) computing an inner product of the signal from which to determine the gesture and the eigenvector; and (d) comparing the computed inner product with the eigenvalue in the database and thus determining the gesture, in which the eigenvector is extracted from signals of all recognizable gestures, and each of the eigenvalues for the respective recognizable gestures is an inner product of the eigenvector and the signal for a corresponding one of the recognizable gestures.

In the gesture recognition method, the eigenvector that is to be stored in the database may be extracted by obtaining a covariance matrix for a signal matrix relating to the signals of all the recognizable gestures and then by obtaining an eigenvalue of the covariance matrix and eigenvectors.

In the gesture recognition method, as the eigenvectors that are to be stored in the database, only an arbitrary number of the eigenvectors obtained from the covariance matrix may be extracted in order of decreasing an eigenvalue.

In the gesture recognition method, the eigenvalues that are stored in the database may be input into a neural network and the neural network may learn a method of determining the gesture using machine learning, and in step (e), the computed inner product may be input into the neural network, and thus the gesture may be determined.

According to still another aspect of the present invention, there is provided a gesture recognition apparatus including: a database in which an eigenvector and an eigenvalue for each recognizable gesture are stored for a signal that is input through a radar apparatus and a signal that results from removing background information from the signal that is input through the radar apparatus: an input unit that receives a signal from which to determine a gesture, as an input, from the radar apparatus: a filter unit that removes the background information from the signal from which to determine the gesture: and a computation unit that computes an inner product of a signal matrix relating to each of the signal from which to determine the gesture and the signal that results from removing the background information and the eigenvector: and a gesture determination unit that compares the computed inner product with the eigenvalue in the database, in which the eigenvector is extracted from signals of all recognizable gestures, and the eigenvalue for each recognizable gesture is an inner product of the eigenvector and the signal for a corresponding one of the recognizable gestures.

In the gesture recognition apparatus, the eigenvector that is to be stored in the database may be extracted by obtaining a covariance matrix for a signal matrix relating to the signals of all the recognizable gestures and then by obtaining an eigenvalue of the covariance matrix and eigenvectors.

In the gesture recognition apparatus, as the eigenvectors that are to be stored in the database, only an arbitrary number of the eigenvectors obtained from the covariance matrix may be extracted in order of decreasing an eigenvalue.

In the gesture recognition apparatus, the gesture determination unit may be a neural network, the eigenvalue may be input into the gesture determination unit, the gesture determination unit may learn a method of determining the gesture using machine learning, and the gesture determination unit may receive the computed inner product, as an input, and determines the gesture.

Advantageous Effects

As described above, the present invention provides that advantage that the user of a single radar contributes to cost reduction and that a gesture can also be recognized in an environment where a camera cannot operate.

BEST MODE

Mode for Invention

Figure 1:
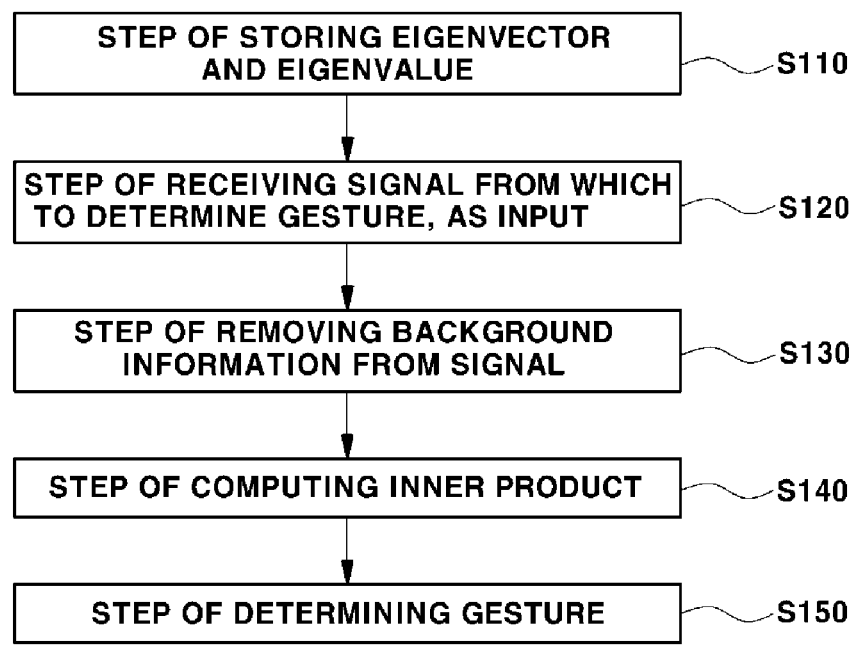
FIG. 1 is a flowchart illustrating a gesture recognition method according to a desirable embodiment of the present invention in terms of the passage of time.

Various modifications to the present invention can be made and thus various embodiments are possible. However, specific embodiments will be described in detail below with reference to the drawings. This is not intended to limit the present invention to the specific embodiments, and therefore, alterations of, equivalents to, and substitutes for, the specific embodiments should all be understood as falling within the technical idea and scope of the present invention. The same constituent element is given the same reference character in each drawing that is referred to for description.

Although the terms first, second, etc. may be used to describe various constituent elements, but should not impose any limitation on the meanings of the constituent elements. These terms are used only to distinguish one constituent element from another. For example, a first constituent element may be expressed as a second constituent element without departing from the scope of the present invention. In the same manner, the second constituent element may also be expressed as the first constituent element. Embodiments of the present invention will be described in detail below with reference to the accompanying drawings.

According to the present invention, a gesture is recognized using a single radar apparatus. A neural network is caused to learn, by inputting in advance signals of a gesture that is to be recognized. This technique is referred to as machine learning, and the neural network recognizes a gesture of a user on the basis of learning experiences.

According to the present invention, the radar apparatus may be an Impulse-Radio Ultra-Wideband (IR-UWB) radar (hereinafter referred to as "UWB radar").

The Ultra-Wideband (UWB) here is a radio technology that uses a frequency range 500 MHz or higher or a broadband frequency that is at a value of a 25% or higher which is defined as a ratio of a fractional bandwidth, that is, a signal bandwidth, to the center frequency. The Ultra-Wideband has various advantages, such as high distance resolution, high penetrability, high resistivity to narrowband noise, and compatibility with any other apparatus that share a frequency.

The UWB radar, manufactured by application of this UWB technology to a radar, transmits an impulse signal available for a very short duration, which has a broadband characteristic in a frequency domain, receives the signal reflecting from an object and a human body, and thus recognizes an ambient environment.

FIG. 1 is a flowchart illustrating a gesture recognition method according to a desirable embodiment of the present invention in terms of the passage of time.

With reference to FIG. 1, the gesture recognition method according to the desirable embodiment includes a step S110 of storing an eigenvector and an eigenvalue, a step S120 of inputting a signal from which to determine a gesture, a step S130 of removing background information from the signal, a step S140 of computing an inner product, and a step S150 of determining the gesture.

In the step S110 of storing an eigenvector and an eigenvalue, pieces of learning information are input into the neural network, computation is performed on the pieces of learning information, and a result of the computation is stored into a database.

First, radar signals of gestures that are learned in a recognizable manner are input from the radar apparatus. Radar signals that result from measuring a gesture that is repeated for a predetermined frame time are input from the radar apparatus.

In addition, according to the present invention, a signal that is input and a signal that results from removing background information from the signal that is input may be considered together.

Figure 2:
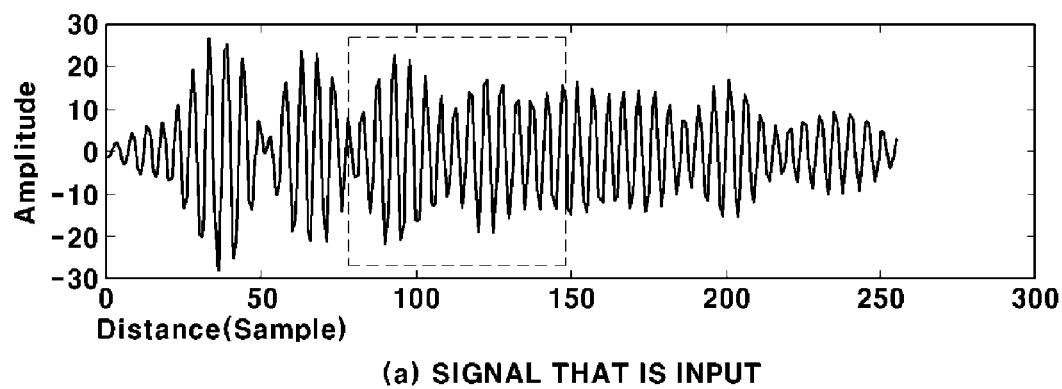
FIG. 2 is a diagram illustrating a signal that is input in the gesture recognition method according to the desirable embodiment of the present invention and a signal that results from removing background information from the signal that is input.
Figure 2:
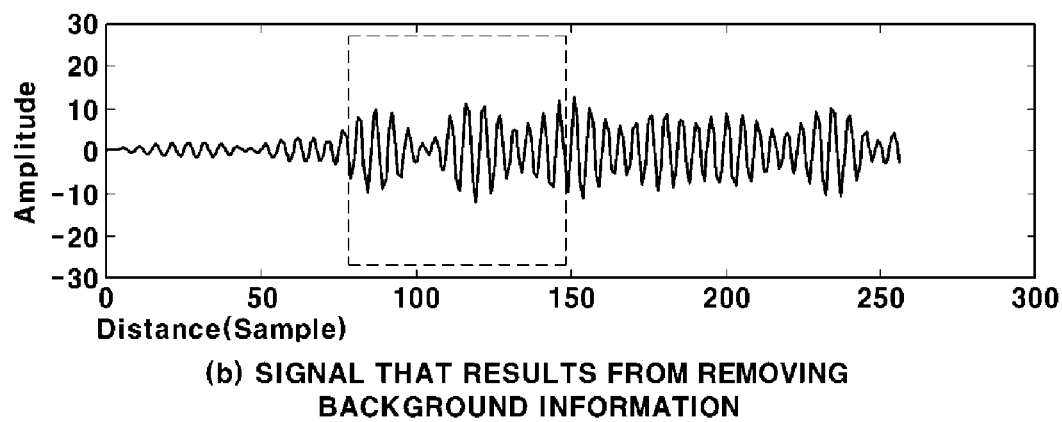

FIG. 2 illustrates a signal that is input in the gesture recognition method according to the desirable embodiment of the present invention and a signal that results from removing the background information from the signal that is input.

With reference to FIG. 2, the input signal represents information according to a distance from the radar apparatus. Therefore, when the signal attained in a state in which no gesture is present is subtracted from the input signal, the background information-free signal is obtained.

In addition, in the gesture recognition method according to the desirable embodiment of the present invention, as illustrated by a dotted-line box in FIG. 1, only a signal that falls within an area, the radius of which is a specific distance from the radar apparatus, may be configured. This area varies depending on a position at which a gesture desired to be recognized occurs.

Now, in order to calculate an eigenvector and an eigenvalue, radar signals of gestures that are to be learned in a recognizable manner are expressed as one signal matrix. For expression as the signal matrix, the number of columns is determined by the number of signals, and the number of rows is determined by the number of signal values per one signal. As an example, if there are five signals and ten signal values per one signal, the signals are expressed as a signal matrix with a dimension (5×10)

Therefore, signal values of frames of each of the signals that correspond to gestures, respectively, are arranged in one row, a signal value according to a distance from the radar apparatus is disposed in each column, and thus all radar signals of gestures that are to be learned in a recognizable manner are expressed as one signal matrix. As an example, if the number of gestures that are desired to be recognized is 6 and the number of frames of a signal that is input per one gesture is 2200, the signal matrix has 13200 rows, and if 81 signal values according to an area where a gesture is to be recognized are used, the signal matrix has 81 columns. Therefore, under the condition that is given as an example, radar signals of motions that are to be learned in a recognizable manner are expressed as a signal matrix Y with a dimension (13200×81).

Then, in order to generate an eigenvector that is to be stored in the database, a covariance matrix for the signal matrix Y is obtained. A method of obtaining a covariance matrix for a signal matrix with a dimension (m×n) is presented in the following mathematical expression.

$$C = \begin{bmatrix} Cov(Y'_1, Y'_1) & \cdots & Cov(Y'_1, Y'_n) \\ \vdots & \ddots & \vdots \\ Cov(Y'_n, Y'_1) & \cdots & Cov(Y'_n, Y'_n) \end{bmatrix}$$ Mathematical Expression 1

In Mathematical Expression 1, C denotes a covariance matrix for the signal matrix Y and n denotes the number of columns of the signal matrix Y. On the other hand, $Cov(Y_a', Y_b')$ is obtained using the following mathematical expression.

$$Cov(Y'_a, Y'_b) = \frac{1}{m} \sum_{i=0}^{m} Y'_{ia} Y'_{ib}$$ Mathematical Expression 2

In Mathematical Expression 2, m denotes the number of rows of the signal matrix Y, Y'a denotes a matrix that results from subtracting the average of values in column a of the signal matrix Y from each of the values in a matrix that contains column a of the signal matrix Y, and Y'ia denotes a value that results from subtracting the average of values in column a of the signal matrix Y from a value of an element in row i, column a of the signal matrix Y.

When a covariance matrix for the signal matrix Y with a dimension (13200×81) is computed using Mathematical Expression 1 and Mathematical Expression 2, a covariance matrix C with a dimension (81×81) is obtained.

Now, an eigenvalue and an eigenvector of the covariance matrix C are computed using the following mathematical expression.

$(C-\lambda I)x=0$ Mathematical Expression 3

In Mathematical Expression 3, I denotes a unit matrix, $\lambda$ denotes the eigenvalue of the matrix C, and x denotes an eigenvector according to eigenvalue $\lambda$ of the matrix C.

Eigenvalue $\lambda$ for setting up Mathematical Expression 3 is obtained using the following Mathematical Expression.

$det(C-\lambda I)=0$ Mathematical Expression 4

In Mathematical Expression 4, $det(C-\lambda I)$ is a characteristic polynomial of matrix $(C-\lambda I)$.

When eigenvalue $\lambda$ satisfying Mathematical Expression 4 is obtained and then Mathematical Expression 3 is used, an eigenvector X according to each eigenvalue $\lambda$ is computed. In a case where the signal matrix Y contains n columns, up to n eigenvalues and up to n eigenvectors according to the n eigenvalues are present.

In the gesture recognition method according to the desirable embodiment of the present invention, of eigenvectors that are obtained using Mathematical Expression 3, only eigenvector with which it is easier to distinguish among gestures in a signal matrix that contains the gestures is used. This eigenvector is determined according to an eigenvalue that corresponds to each eigenvector. An eigenvector with which signals are more distinguishable has an eigenvalue great in magnitude. When an eigenvector having a small magnitude eigenvalue is used, a difference between signal values is small and thus, it may be difficult to distinguish among movements that make up a gesture. That is, the use of eigenvectors that have an eigenvalue great in magnitude makes it easy to distinguish among gestures that are input.

Therefore, in the gesture recognition method according to the desirable embodiment of the present invention, for use, only an arbitrary number of the obtained eigenvectors are extracted in order of decreasing an eigenvalue. As an example, in the gesture recognition method according to the desirable embodiment of the present invention, only 8 eight eigenvectors may be extracted in order of decreasing an eigenvalue, for storing in the database.

Figure 3:
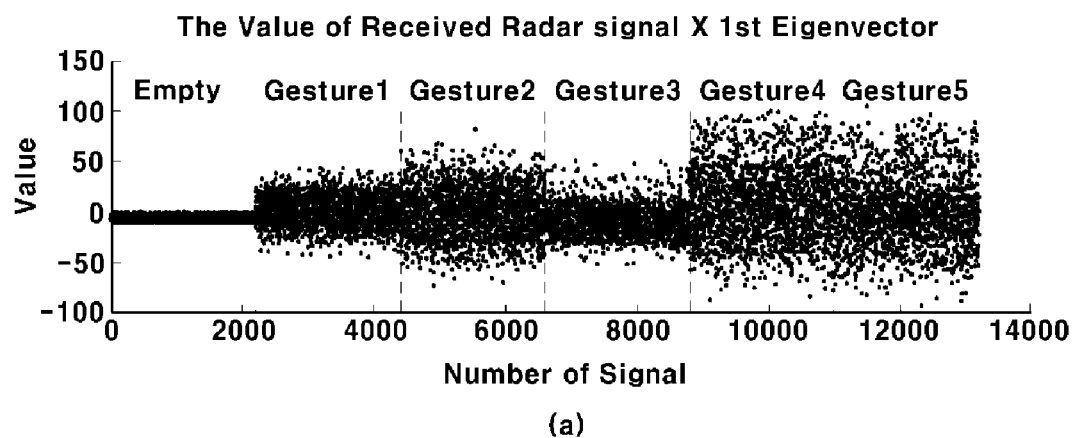
FIG. 3 illustrates an inner product of an eigenvector and each signal matrix.
Figure 3:
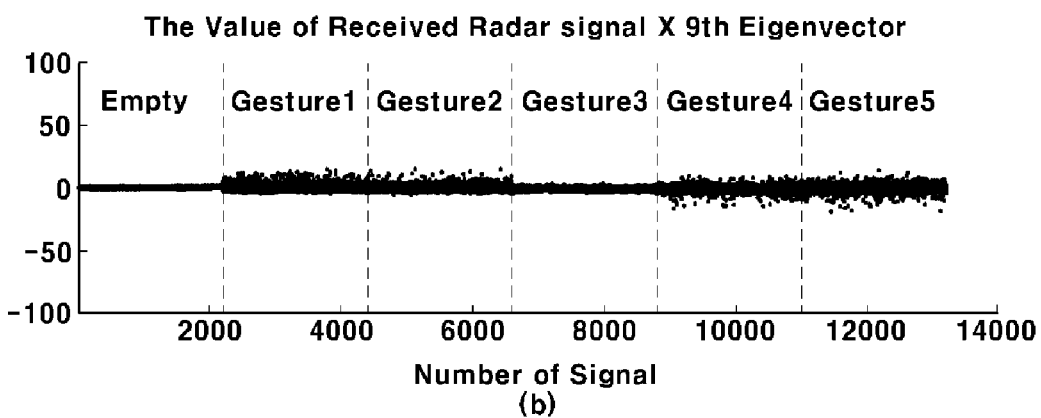

FIG. 3 illustrates an inner product of an eigenvector and each signal matrix.

FIG. 3(a) illustrates an inner product of an eigenvector having a relatively-great eigenvalue and each gesture. FIG. 3(b) illustrates an inner product of a relatively-small eigenvalue and each gesture. As illustrated in FIG. 3, with an eigenvector having a small eigenvalue, each gesture is relatively difficult to determine, and therefore, the use of an eigenvector having a great eigenvalue is beneficial.

Now, signals that are input are converted into a signal matrix on a per-gesture basis, computation for obtaining an inner product is performed on the resulting signal matrix and the stored eigenvectors, and then the obtained inner product is stored, as an eigenvalue of each gesture, in the database.

Through the processes described above, eigenvectors of gestures that are recognizable and eigenvalues of the gestures are stored in the database. The stored eigenvalues of the gestures are input into the neural network, and the neural network learns a method of determining each of the gestures through a machine learning process.

This process of obtaining an eigenvector and an eigenvalue and learning a gesture is performed on both a radar signal that is input and a signal that results from removing background information.

The step S120 of inputting a signal from which to determine a gesture is a step of receiving a signal from which to determine a gesture, as an input, through the radar apparatus. Signal information according to a distance is input through the signal radar apparatus on a per-frame basis.

The step S130 of removing background information from the signal is a step of removing background information from the signal that is input. In the step S110, as described above, the signal that is input is caused to attain the state where no gesture is present and thus the signal that results from removing the background information is obtained.

The step S140 of computing an inner product is a step of computing an inner product of a signal from which to determine a gesture and an eigenvector stored in the database. As described with reference to the step S110, signals from which a gesture is to be determined are expressed as a signal matrix. The signals are expressed as a signal matrix in such a manner that the signal matrix contains the same column as the signal matrix relating to the signal that is learned in the step S110, that is, using only a signal that falls within the same area, the radius of which is a specific distance from the radar apparatus, as the learned signal. On the other hand, the number of rows of the signal matrix, that is, the number of frames of the signal is not limited.

Now, an inner product of a signal from which to determine a gesture and an eigenvector stored in the step S110 is computed.

In the step S150 of determining a gesture, an inner product that computed on a per-eigenvector basis in the step S140 is input into the neural network, and the neural network determines to which one of the gestures learned in the step S110 a gesture relating to a signal that is input in the step S120 corresponds.

In addition, in a case where a gesture that is not yet learned in the neural network is input, when absolute values of results of the input are chosen and add up, a constant value or higher is obtained. On the basis of this value, the gesture that is not yet learned is regarded as noise.

The gesture recognition method according to the desirable embodiment of the present invention, which described above, is performed by a gesture recognition apparatus according to a desirable embodiment of the present invention.

Figure 4:
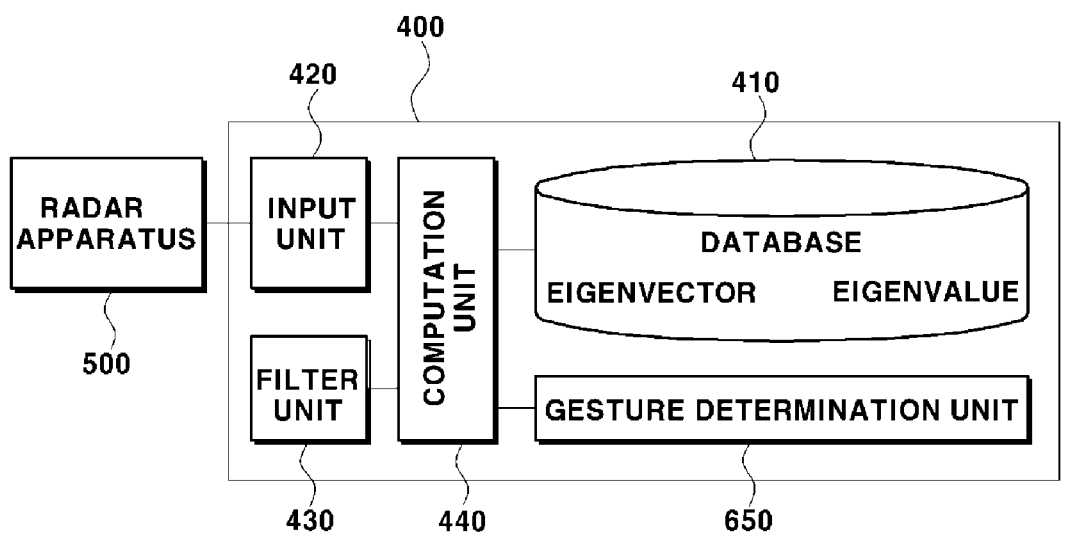
FIG. 4 is a diagram illustrating a configuration of a gesture recognition apparatus according to a desirable embodiment of the present invention.

FIG. 4 is a diagram illustrating a configuration of the gesture recognition apparatus according to the desirable embodiment of the present invention.

With reference to FIG. 4, the gesture recognition apparatus according to the desirable embodiment of the present invention includes a database 410, an input unit 420, a filter unit 430, a computation unit 440, and a gesture determination unit 450.

The eigenvector and the eigenvalue that is on a per-gesture basis, which are computed in the step S110, are stored in the database 410.

Radar signals of gestures that, in the step S110, are to be learned in a recognizable manner, and a signal from which to determine a gesture in the step S120 are input from a radar apparatus 500 to the input unit 420.

The filter unit 430 performs an operation of removing background information from signals that are input into the input unit 420. With reference to FIG. 2, the filter unit 430 obtains the background information-free signal by subtracting the signal attained in a state in which no gesture is present from the input signal.

The computation unit 440 performs computation for obtaining the eigenvector and the eigenvalue in the step S110 and the computation for obtaining the inner product in the step S140. Computation processes are described above and thus detail descriptions thereof are omitted.

The gesture determination unit 450 may be a neural network that is capable of learning using machine learning. The gesture determination unit 450 is caused to learn using the machine learning, in such a manner that a gesture is determined on the basis of the eigenvalues in the database 410, which are input into the gesture determination unit 450 itself. The gesture determination unit 450 determines to which one of the learned gestures a gesture relating to a signal from which to determine a gesture corresponds. When the gesture from which a gesture is to be determined does not correspond to any one of the learned gestures, the gesture determination unit 450 regards the signal from which to determine a gesture, as noise.

As described above, according to the present invention, a gesture is recognized using the radar apparatus. Thus, in an environment where a camera cannot operate, a gesture can also be recognized. The advantage of this is that the use of a single radar leads to a cost reduction.

The present invention is described above using the specific matters, such as the constituent elements, and the specific embodiments, with reference to the drawings. These are only provided to help with getting a full understanding of the present invention and are not intended to limit the present invention to the embodiments described above. From the description provided above, it is apparent to a person of ordinary skill in the art that various alterations and modifications are possible. Therefore, the technical idea of the present invention is not limited to the embodiments described above, and subject matters that are claimed in claims and equivalents of, and equivalent modifications to, the subject matters fall within the technical scope of the present invention.

The invention claimed is:

1. A gesture recognition method comprising steps of:
    (a) storing in a database an eigenvector and an eigenvalue for each recognizable gesture, with respect to a signal that is input through a radar apparatus and a signal that results from removing background information from the signal that is input through the radar apparatus;
    (b) receiving a signal from which to determine a gesture, as an input, from the radar apparatus;
    (c) removing the background information from the signal from which to determine the gesture;
    (d) computing an inner product of a signal matrix relating to each of the signal from which to determine the gesture and the signal that results from removing the background information and the eigenvector; and
    (e) comparing the computed inner product with the eigenvalue in the database,
    wherein the eigenvector is extracted from signals of all recognizable gestures and, each of the eigenvalues for the respective recognizable gestures is an inner product of the eigenvector and the signal for a corresponding one of the recognizable gestures.

2. The gesture recognition method according to claim 1, wherein the eigenvector that is to be stored in the database is extracted by obtaining a covariance matrix for a signal matrix relating to the signals of all the recognizable gestures and then by obtaining an eigenvalue of the covariance matrix and eigenvectors.

3. The gesture recognition method according to claim 2, wherein, as the eigenvectors that are to be stored in the database, only an arbitrary number of the eigenvectors obtained from the covariance matrix are extracted in order of decreasing an eigenvalue.

4. The gesture recognition method according to claim 3, wherein the eigenvalues that are stored in the database are input into a neural network and the neural network learns a method of determining the gesture using machine learning, and wherein in the step (e), the computed inner product is into the neural network, and thus the gesture is determined.

5. A gesture recognition method comprising steps of:
    (a) storing an eigenvector and an eigenvalue for each recognizable gesture;
    (b) receiving a signal from which to determine a gesture, as an input, from a radar apparatus;
    (c) computing an inner product of the signal from which to determine the gesture and the eigenvector; and (d) comparing the computed inner product with the eigenvalue in the database and thus determining the gesture,
wherein the eigenvector is extracted from signals of all recognizable gestures, and each of the eigenvalues for the respective recognizable gesture is an inner product of the eigenvector and the signal for a corresponding one of the recognizable gestures.

6. The gesture recognition method according to claim 5, wherein the eigenvector that is to be stored in the database is extracted by obtaining a covariance matrix for a signal matrix relating to the signals of all the recognizable gestures and then by obtaining an eigenvalue of the covariance matrix and eigenvectors.

7. The gesture recognition method according to claim 6, wherein, as the eigenvectors that are to be stored in the database, only an arbitrary number of the eigenvectors obtained from the covariance matrix are extracted in order of decreasing an eigenvalue.

8. The gesture recognition method according to claim 7, wherein the eigenvalues that are stored in the database are input into a neural network and the neural network learns a method of determining the gesture using machine learning, and wherein in the step (e), the computed inner product is into the neural network, and thus the gesture is determined.

9. A gesture recognition apparatus comprising:
a database in which an eigenvector and an eigenvalue for each recognizable gesture are stored for a signal that is input through a radar apparatus and a signal that results from removing background information from the signal that is input through the radar apparatus:
an input unit that receives a signal from which to determine a gesture, as an input, from the radar apparatus:
a filter unit that removes the background information from the signal from which to determine the gesture: and
a computation unit that computes an inner product of a signal matrix relating to each of the signal from which to determine the gesture and the signal that results from removing the background information and the eigenvector: and
a gesture determination unit that compares the computed inner product with the eigenvalue in the database,
wherein the eigenvector is extracted from signals of all recognizable gestures, and each of the eigenvalues for the respective recognizable gestures is an inner product of the eigenvector and a corresponding one of the signals for the respective recognizable gestures.

10. The gesture recognition apparatus according to claim 9, wherein the eigenvector that is to be stored in the database is extracted by obtaining a covariance matrix for a signal matrix relating to the signals of all the recognizable gestures and then by obtaining an eigenvalue of the covariance matrix and eigenvectors.

11. The gesture recognition apparatus according to claim 10, wherein, as the eigenvectors that are to be stored in the database, only an arbitrary number of the eigenvectors obtained from the covariance matrix are extracted in order of decreasing an eigenvalue.

12. The gesture recognition apparatus according to claim 11, wherein the gesture determination unit is a neural network,
wherein the eigenvalue is input into the gesture determination unit,
wherein the gesture determination unit learns a method of determining the gesture using machine learning, and
wherein the gesture determination unit receives the computed inner product, as an input, and determines the gesture.

* * * * *